United States Patent
Eckert

(10) Patent No.: US 11,627,066 B2
(45) Date of Patent: Apr. 11, 2023

(54) IGP TOPOLOGY INFORMATION AND USE FOR BIER-TE

(71) Applicant: Huawei Technologies Co., Ltd., Shenzhen (CN)

(72) Inventor: Toerless Eckert, Mountain View, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 92 days.

(21) Appl. No.: 17/008,373

(22) Filed: Aug. 31, 2020

(65) Prior Publication Data

US 2021/0021507 A1 Jan. 21, 2021

Related U.S. Application Data

(63) Continuation of application No. PCT/US2019/020291, filed on Mar. 1, 2019.
(Continued)

(51) Int. Cl.
*H04L 45/02* (2022.01)
*H04L 41/0659* (2022.01)
(Continued)

(52) U.S. Cl.
CPC .......... *H04L 45/02* (2013.01); *H04L 41/0659* (2013.01); *H04L 41/0816* (2013.01);
(Continued)

(58) Field of Classification Search
CPC ............. H04L 45/02; H04L 41/0659; H04L 41/0816; H04L 41/12; H04L 47/125;
(Continued)

(56) References Cited

U.S. PATENT DOCUMENTS

| 10,341,221 B2 | 7/2019 | Eckert et al. |
| 10,341,222 B2 | 7/2019 | Eckert et al. |
| 2015/0078380 A1* | 3/2015 | Wijnands ............ H04L 45/66 370/390 |

(Continued)

FOREIGN PATENT DOCUMENTS

| WO | WO 2017/059708 | * | 4/2017 | ........... H04L 12/721 |
| WO | WO-2017148139 A1 | | 9/2017 | |

(Continued)

OTHER PUBLICATIONS

"International Application Serial No. PCT/US2019/020291, International Search Report dated Apr. 15, 2019", 4 pgs.
"International Application Serial No. PCT/US2019/020291, Written Opinion dated Apr. 15, 2019", 8 pgs.
(Continued)

*Primary Examiner* — Christopher R Crompton
(74) *Attorney, Agent, or Firm* — Schwegman Lundberg & Woessner, P.A.

(57) ABSTRACT

A first Bit Index Explicit Replication Traffic Engineering (BIER-TE) node of a network includes a first interface to a second BIER-TE node in the network. The first node includes a configuration topology and an operational topology. The configuration topology represents the configuration of the network and the operational topology represents usable and consistent links in the network topology. The first node receives first network topology information and updates the configuration topology with the first network topology information. The first node also verifies the first network topology information and updates the operational topology with the first network topology information responsive to the verification. The first node receives a packet including a routing bitstring having a set bit at a first bit index corresponding to the first interface and routes the (Continued)

packet to the second node responsive to the routing bitstring and the operational topology.

20 Claims, 7 Drawing Sheets

Related U.S. Application Data

(60) Provisional application No. 62/637,996, filed on Mar. 2, 2018.

(51) Int. Cl.
  *H04L 41/0816* (2022.01)
  *H04L 41/12* (2022.01)
  *H04L 47/125* (2022.01)
  *H04L 69/325* (2022.01)
(52) U.S. Cl.
  CPC ............ *H04L 41/12* (2013.01); *H04L 47/125* (2013.01); *H04L 69/325* (2013.01)
(58) Field of Classification Search
  CPC ............... H04L 69/325; H04L 43/0811; H04L 12/56; H04L 69/16; G06F 11/1423; G06F 11/2002; H04W 40/24

USPC ........................................................ 370/235
See application file for complete search history.

(56) References Cited

U.S. PATENT DOCUMENTS

| | | |
|---|---|---|
| 2015/0138961 A1 | 5/2015 | Wijnands et al. |
| 2016/0254991 A1* | 9/2016 | Eckert ................. H04L 12/4633 370/225 |
| 2016/0293014 A1* | 10/2016 | Gomez ................. H04L 51/216 |

FOREIGN PATENT DOCUMENTS

| | | | | |
|---|---|---|---|---|
| WO | WO 2018/107955 | * | 11/2017 | ........... H04L 12/761 |
| WO | WO-2019169268 A1 | | 9/2019 | |

OTHER PUBLICATIONS

Eckert, T, et al., "Protection Methods for BIER-TE draft-eckert-bier-te-frr-02.txt", [Online]. Retrieved from the Internet: <Network Working Group, Internet Engineering Task Force, IETF>, (Jun. 30, 2017), 1-16.

Wijnands, IJ, "Multicast Using Bit Index Explicit Replication (BIER); rfc8279.txt", [Online], Retrieved from the Internet: <Internet Engineering Task Force, IETF;>, (Nov. 20, 2017), 1-43.

* cited by examiner

IGP TOPOLOGY INFORMATION AND USE FOR BIER-TE

CLAIM OF PRIORITY

This application is a continuation application of International Application No. PCT/US2019/020291, filed 1 Mar. 2019, which claims the benefit of priority to U.S. Provisional Application No. 62/637,996, filed 2 March 2018, and titled "IPG Topology Information and use for BIER-TE," the benefit of priority of each of which is claimed herein, and which applications and publication are hereby incorporated herein by reference in their entirety.

TECHNICAL FIELD

The present disclosure is related to Bit Index Explicit Replication Traffic Engineering (BIER-TE), and, in particular, to the use of an interior gateway protocol (IGP) to facilitate BIER-TE deployment.

BACKGROUND

BIER-TE forwards and replicates packets similarly to BIER based on a bitstring in the packet header but it does not use IGP data. BIER-TE supports traffic engineering by explicit hop-by-hop forwarding and loose hop forwarding of packets. It also supports Fast ReRoute (FRR) for link and node protection and incremental deployment. Because BIER-TE, like BIER, operates without explicit in-network tree-building and supports traffic engineering, it is more similar to segment routing than Resource Reservation Protocol-Traffic Engineering (RSVP-TE). BIER-TE is described in a Network Working Group Draft intitled "Traffic Engineering for Bit Index Explicit Replication (BIER-TE)" dated Oct. 23, 2018 which is available from the Internet Engineering Task Force (IETF).

SUMMARY

The examples below describe a network configuration in which an Interior Gateway Protocol (IGP) is used to signal information to each BIER-TE node in the network to make BIER-TE deployment easier and more automated while simultaneously reducing the dependency on a Software Defined Network Path Computation Element (SDN/PCE) controller. In the examples described below, each BIER-TE node maintains separate operational and configuration network topologies which allow each BIER-TE node to traffic-engineer paths through the network without using an SDN/PCE controller. The BIER-TE node can modify the bitstring in a packet to route the packet around congested links and/or links that have failed. Verification methods implemented in the node also allow the operational topology to contain only verified information while the operational topology includes both the verified and unverified information.

These examples are encompassed by the features of the independent claims. Further embodiments are apparent from the dependent claims, the description and the figures.

According to a first aspect, an apparatus for use in a first node of a network including a plurality of nodes includes a first interface to a second node of the plurality of nodes, a memory including program instructions, a configuration topology, and an operational topology. A processor of the first node is coupled to the memory. The program instructions configure the processor to receive first network topology information and update the configuration topology with the first network topology information. The program instructions further configure the processor to verify the first network topology information and update the operational topology with the first network topology information responsive to the verification of the first network topology information. The instructions condition the processor to receive a packet including a routing bitstring having a set bit at a first bit index corresponding to the first interface; and to route the packet to the second node responsive to the routing bitstring and the operational topology.

In a first implementation form of the apparatus according to the first aspect as such, the program instructions that condition the processor to receive the first network topology information condition the processor to receive a bit index assignment for a second interface of the first node. The program instructions that configure the processor to verify the first network topology information condition the processor to determine that a conflicting bit index assignment exists in the operational topology. The program instructions that condition the processor to update the operational topology include instructions that condition the processor not to enter the received bit index assignment in the operational topology.

In a second implementation form of the apparatus according to the first aspect as such, the program instructions further configure the processor to: determine that the conflicting bit index assignment no longer exists in the operational topology and update the operational topology to include the received bit index assignment from the configuration topology.

In a third implementation form of the apparatus according to the first aspect as such, the received first network topology information indicates failure of a second interface of the first node. The instructions that condition the processor to update the configuration topology configure the processor not to update the configuration topology information and the instructions that condition the processor to update the operational configuration configure the processor to remove the second interface of the first node from the operational topology.

In a fourth implementation form of the apparatus according to the first aspect as such, the first network topology information includes a connectivity change from a third node in the network. The program instructions that configure the processor to verify the first network topology information configure the processor to determine that the received connectivity change indicates a wiring misconfiguration. The program instructions that condition the processor to update the operational topology include instructions that condition the processor not to enter the received connectivity change from the third node in the operational topology.

In a fifth implementation form of the apparatus according to the first aspect as such, an entry in the operational topology corresponding to the first interface has a first bit type parameter and the received first network topology information includes information for a second interface of a second node which corresponds to the first interface of the first node. The second interface has a second bit type parameter. The program instructions that configure the processor to verify the first network topology information configure the processor to determine that the first bit type parameter is not consistent with the second bit type parameter. The program instructions that condition the processor to update the operational topology include instructions that condition the processor not to enter the received configuration for the second interface of the second node in the operational topology.

In a sixth implementation form of the apparatus according to the first aspect as such, the received first network topology includes topology information for a plurality of interfaces of a respective plurality of nodes. The program instructions that configure the processor to verify the first network topology information configure the processor to determine that the plurality of interfaces include a first set of interfaces having consistent parameters and a second set of interfaces having inconsistent parameters. The program instructions that condition the processor to update the operational topology include instructions that condition the processor update the operational topology with the topology information for the first set of interfaces and not to update the operational topology with the inconsistent topology information for the second set of interfaces.

In a seventh implementation form of the apparatus according to the first aspect as such, the first network topology information includes a second bit index having parameters indicating a third node and an ingress group of which the first node is a member. The instructions further configure the processor to determine a forward-routed path from the first node to the third node and to update the configuration topology to include a second interface having parameters indicating the second bit index and the forward routed path. The instructions that condition the processor to update the operational configuration configure the processor to include the second interface having parameters indicating the second bit index and the forward routed path.

In an eighth implementation form of the apparatus according to the first aspect as such, the program instructions that configure the processor to receive the first network topology information configure the processor to receive Interior Gateway Protocol (IGP) data as the first network topology information.

In a ninth implementation form of the apparatus according to the first aspect as such, the first node includes a first bit-indexed forwarding table (BIFT) including the operational topology and a second BIFT including the configuration topology. The program instructions that configure the processor to receive the packet configure the processor to receive a Bit Index Explicit Replication Traffic Engineering (BIER-TE) packet including a bitstring indicating routing data, the bitstring corresponding to the bits in the first BIFT and the second BIFT.

According to a second aspect, method for use in a first node of a network having an interface includes receiving first network topology information and updating a configuration topology with the first network topology information. The method further includes verifying the first network topology information and updating the operational topology with the first network topology information responsive to the verification of the first network topology information. The method includes receiving a packet including a routing bitstring having a set bit at a first bit index corresponding to the first interface and routing the packet to the second node responsive to the routing bitstring and the operational topology.

In a first implementation form of the method according to the second aspect as such, the received first network topology includes a bit index assignment for a second interface of the first node. The verifying of the first network topology information includes determining that a conflicting bit index assignment exists in the operational topology and the updating of the operational topology includes not entering the received bit index assignment in the operational topology.

In a second implementation form of the method according to the second aspect as such, the method includes determining that the conflicting bit index assignment no longer exists in the operational topology; and updating the operational topology to include the received bit index assignment from the configuration topology.

In a third implementation form of the method according to the second aspect as such, the received first network topology information indicates failure of a second interface of the first node. The updating of the configuration topology includes not updating the configuration topology information to indicate the failure of the second interface of the first node. The updating of the operational configuration includes removing the second interface of the first node from the operational topology.

In a fourth implementation form of the method according to the second aspect as such, an entry in the operational topology corresponding to the first interface has a first bit type parameter and the received first network topology information includes configuration information for a second interface of a second node that corresponds to the first interface of the first node, the second interface having a second bit type parameter. The verifying of the first network topology information includes determining that the first bit type parameter is not consistent with the second bit type parameter and the updating of the operational topology includes not entering the received configuration for the second interface of the second node in the operational topology.

In a fifth implementation form of the method according to the second aspect as such, the received the first network topology information includes topology information for a plurality of interfaces of a respective plurality of nodes. The verifying of the first network topology information includes determining that the plurality of interfaces include a first set of interfaces having consistent parameters and a second set of interfaces having inconsistent parameters and the updating of the operational topology includes updating the operational topology with the topology information for the first set of interfaces and not updating the operational topology with the inconsistent topology information for the second set of interfaces.

In a sixth implementation form of the method according to the second aspect as such, the first network topology information includes a second bit index having parameters indicating a third node and an ingress group of which the first node is a member. The method includes determining a forward-routed path from the first node to the third node and the updating of the configuration topology includes updating the configuration topology to include a second interface having parameters indicating the second bit index and the forward routed path. The method also includes updating of the operational configuration to include the second interface having parameters indicating the second bit index and the forward routed path.

In a seventh implementation form of the method according to the second aspect as such, the method receives Interior Gateway Protocol (IGP) data as the first network topology information.

In an eighth implementation form of the method according to the second aspect as such, the operational topology is included in a first bit-indexed forwarding table (BIFT) and a second BIFT including the configuration topology; and the receiving of the packet includes receiving a Bit Index Explicit Replication Traffic (BIER-TE) packet including a bitstring indicating routing data, the bitstring corresponding to the bits in the first BIFT and the second BIFT.

According to a third aspect, a memory including program instructions is coupled to a processor of a first node of a network that includes a plurality of nodes. The first node has a first interface to a second node and network topology information including a configuration topology and an operational topology. The program instructions configure the processor to receive first network topology information and update the configuration topology with the first network topology information. The program instructions further configure the processor to verify the first network topology information and update the operational topology with the first network topology information responsive to the verification of the first network topology information. The program instructions also configure the processor to receive a packet including a routing bitstring having a set bit at a first bit index corresponding to the first interface; and route the packet to the second node responsive to the routing bitstring and the operational topology.

DETAILED DESCRIPTION

Figure 1:
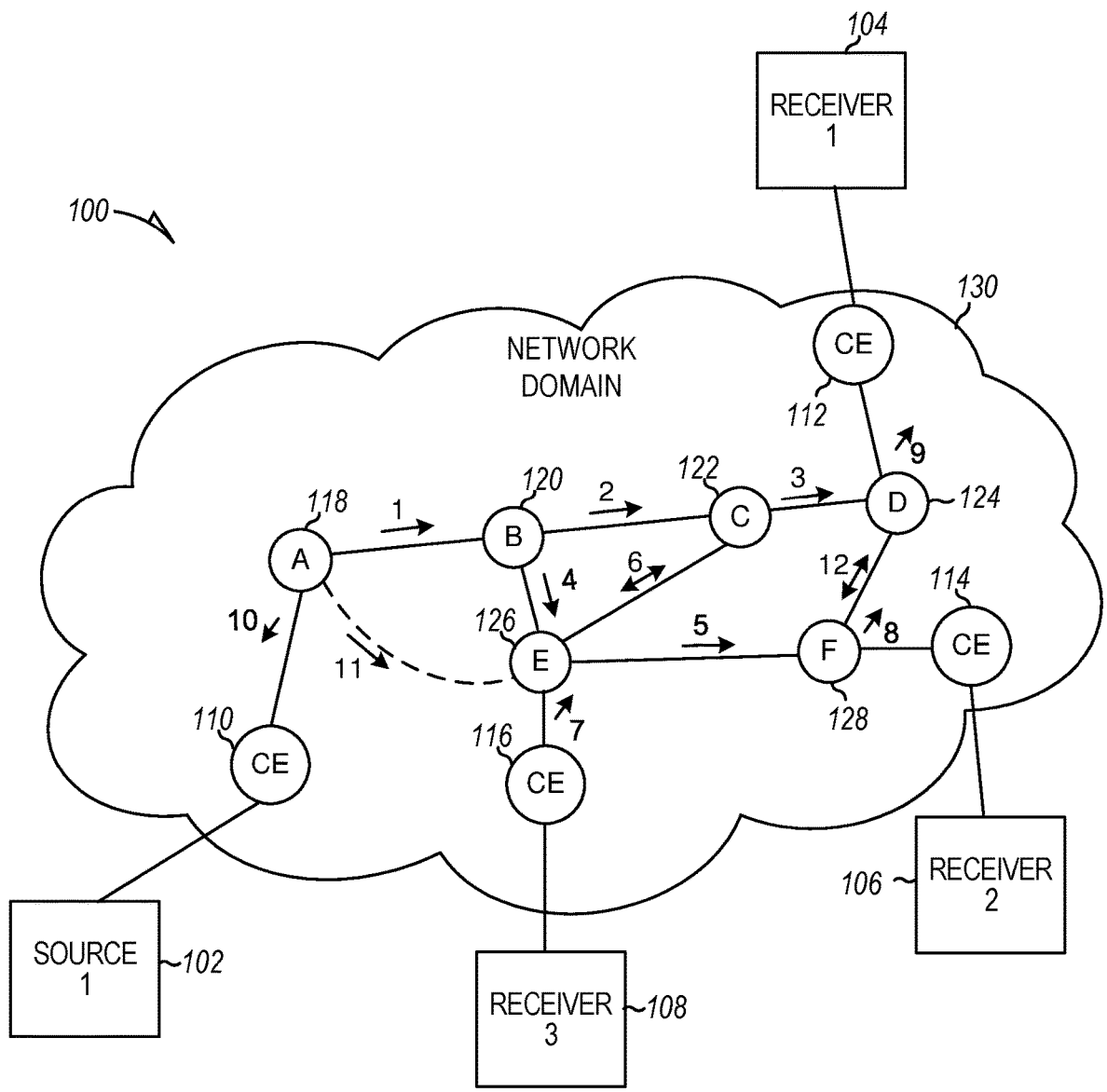
FIG. 1 is a block diagram showing components of a network domain according to an example embodiment.

In the following description, reference is made to the accompanying drawings that form a part hereof, and in which is shown by way of illustration specific embodiments which may be practiced. These embodiments are described in sufficient detail to enable those skilled in the art to practice the disclosed subject matter, and it is to be understood that other embodiments may be utilized, and that structural, logical and electrical changes may be made without departing from the scope of the appended claims. The following description of example embodiments is, therefore, not to be taken in a limited sense.

BIER-TE is a packet forwarding protocol that allows multicast paths through a network to be defined using a relatively small amount of information, a BIER-TE bitstring. Embodiments described below augment BIER-TE by generating, in each network node (also referred to herein as a BFR), two BIFTs an operational BIFT (OBIFT) and a configuration BIFT (CBIFT). The CBIFT contains the configured topology of the network domain and the OBIFT contains the operational topology. The BFR uses the OBIFT to route BIER-TE messages through the network domain The OBIFT and CBIFT are generated in each BFR from a flooded IGP topology received by the BFR. An application running on the BFR checks the IGP topology against the OBIFT and CBIFT for problems, errors, inconsistencies in the network domain and updates the OBIFT to remove and/or resolve any such problems, errors and/or inconsistencies. The configured IGP topology is maintained in the CBIFT. Because each BFR maintains an operational topology it can reroute data around a problem or error in the network, independently of the routing specified in the BIER-TE bitstring.

BIER-TE ingress BFR encodes path-related information for a BIER message in a bitstring carried in the header of the BIER-TE message. The BIER-TE message includes an encapsulated packet. The bits in the bitstring represent links between network nodes. In the embodiments described below, "link" is used in a general sense to indicate a data connection between two network nodes or between a network node and another protocol level of the network. BIER-TE contrasts with non-TE BIER (also referred to as BIER) in which bits in a bitstring represent receivers of a multicast packet (such as egress nodes connected to respective receivers, or egress interfaces of such egress nodes). The links in the embodiments described below function as path segments, or sub-paths, such that the path for a message is formed from a series of connected links Links represented by bit positions may also be referred to as "interfaces," "hops" or "adjacencies."

Different types of links may be represented by a bit position in a BIER-TE bitstring. For example, a link may represent a direct physical connection between two adjacent nodes (also referred to as a forward-connected link). This type of direct link can be defined as either a one-way link or a two-way link A bit position may also represent an indirect connection between one node and a non-adjacent node (also referred to herein as a forward-routed link), such that the link includes one or more intervening nodes. In addition to these direct and indirect connections between network nodes, a bit position may represent a connection between the BIER-TE protocol layer and a higher protocol layer of the network (e.g., at an ingress or egress node).

Preparation for forwarding of a packet by BIER-TE includes three basic processes. The first process determines the path (e.g., a multicast tree) for packets in a multicast transmission. The links that constitute the path are represented by bit positions in the bitstring. These bit positions are assigned to the links during network configuration. The second process encapsulates the packet to include the bitstring having set bits in the bit positions corresponding to the links along the determined path. For each BFR along the path, bit positions representing links connected to that BFR are added to a BIER-TE forwarding table (e.g., the OBIFT and/or CBIFT) at the node, along with appropriate forwarding instructions.

FIG. 1 shows an example network 100 that includes a network domain 130 including BIER-TE BFRs 118, 120, 122, 124, 126, and 128. Each of the BFRs 118, 120, 122, 124, 126, and 128, is configured to forward packets or other messages to other interior nodes in the network or to a bit-forwarding egress router (BEFR) such as the nodes 110, 112, 114, and 116. The example BIER-TE-enabled nodes are configured to store and use respective BIFTs based on BIER-TE bit position assignments, as explained further below. In some embodiments, some or all of these BIER-TE-enabled BFRs are also enabled to forward non-TE BIER packets in a hybrid implementation. The letters A through F in the network 100 shown in FIG. 1 correspond to respective unique identifiers for BIER-TE-enabled BFRs. The examples described below use these letters to reference the respective nodes and to describe links and paths in network domain 130. The solid lines between the nodes represent data connections between them; in an embodiment, the connections are physical point-to-point links In the example network domain 130 shown in FIG. 1, BIER-TE-enabled nodes 118, 120, 122, 124, 126, and 128 form a provider network, or domain 130. the network domain 130 may, for example, be used by an Internet service provider to transport packets to customers. The domain includes core nodes 120 and 122, and provider edge nodes 118, 124, 126, and 128. The provider edge nodes 118, 124, 126, and 128 are coupled to respective customer edge (CE) nodes 110, 112, 114, and 116. Host devices 102, 104, 106, and 108 are coupled to the respective CE nodes 110, 112, 114, and 116. The host 102 is a multicast source, while hosts 104, 106, and 108 are multicast receivers, or subscribers. In the example network, provider edge node 118 is a bit-forwarding ingress router (BFIR) for multicast data packets. The BFIR 118 encapsulates packets into BIER-TE messages for transmission through the network. BFIR 118 is coupled to the source 102 by the CE node 110. Multicast data packets from source 102 enter the BIER-TE network via BFIR 118. Each of BIER-TE-enabled provider edge nodes 124, 126, and 128 is configured as a bit-forwarding egress router (BFER). The BFERs can be connected (directly or via CE routers) to hosts, such as receivers, or other networks. In the example network, a BFER is the last BIER-TE-enabled node on a path between a source and a receiver. Each of the BFERs 124, 126, and 128 decapsulates the BIER-TE messages to recover the packets which are then provided to the respective provider edge nodes 112, 114, and 116.

The example network 100 does not include a central controller. Instead, the BIER-TE-enabled BFRs 118, 120, 122, 124, 126, and 128 interact with each other to update their respective OBIFTs and CBIFTs which the BFRs use to maintain one or more topologies for the network domain 130. The topology information is obtained from the other BFRs via IGP flooding or a similar configuration protocol. Although the embodiments below describe IGP flooding as the control protocol, control communication among the BIER-TE-enabled BFRs 118, 120, 122, 124, 126, and 128 may occur through one or more other control protocols. In an embodiment the same physical links used to transmit messages through the network are used to transmit control communications (e.g., IGP flooding) among the BIER-TE enabled nodes 118, 120, 122, 124, 126, and 128.

Each of the BIER-TE enabled BFRs 118, 120, 122, 124, 126, and 128 performs several functions. It assigns bit positions to links within the BIER-TE-enabled portion of network 100, communicates the bit position assignments to BIFTs in other ones of the BIER-TE-enabled BFRs, determines the path(s) for messages within a particular multicast group, and determines the bit positions for a particular multicast group path.

To assign bit positions, each example BIER-TE BFR 118, 120, 122, 124, 126, and 128 uses topological information for the network. In an embodiment, the network nodes are running an interior gateway protocol (IGP), and each BIER-TE node 118, 120, 122, 124, 126, and 128 obtains the topology of network 100 through IGP advertisements. Ingress BIER-TE nodes (BFIRs), such as node 118 use multicast group membership information to assign bit positions. Bit position assignments are used only for network links that are included in a path taken by messages in the network. Not every link in the network receives a bit assignment. Multicast group membership information can, therefore, assist the BIER-TE nodes to determine which network links should be assigned bit positions and included in explicit paths. In an embodiment, provider edge nodes 118, 124, 126, and 128 of network 100 communicate with each other to identify their respective hosts as either a source of or a receiver of (subscriber to) a particular multicast transmission and inform each other of any changes in group membership status.

An example assignment of bit positions to links is illustrated in FIG. 1. In the notation used in FIG. 1, a bit position assigned to a link is indicated by a numeral adjacent to the link Other aspects of the notation represent different types of links, as explained further below. Some bit position assignments include a bit position number adjacent to a one-way arrow. The arrow is oriented to point in the direction of the link represented by the bit position. For example, bit position 1 is assigned to the direct link between BFR A and BFR B, for a message traveling from BFR A to BFR B. In other words, bit position 1 represents a one-way direct link between node A and node B. Such a direct link may also be called, for example, a "direct adjacency," a "connected adjacency," a "forward-connected adjacency" or a "direct-hop" link or adjacency. Similarly, bit position 2 is assigned to a one-way direct link between BFR B and BFR C, and bit position 4 to a one-way direct link between BFR B and BFR E. Other one-way direct links between BIER-TE-enabled nodes in network 100 include those between BFRs C and D (assigned bit position 3) and between BFRs E and F (assigned bit position 5).

In an example embodiment, assignment of a bit position number to a link means that a bitstring encoding a path containing that link will have a set bit (a bit value of "1" rather than "0") in the bit position corresponding to the bit position number of the link, counting from the right. For example, a 12-bit bitstring encoding only the path between BFR B and BFR C in FIG. 1 (assigned bit position 2) is denoted {0000 0000 0010}, where bits in the bitstring are arranged in groups of four for readability. Other conventions may be used in embodiments of the methods and systems described herein, however. For example, the use of a bit value of "1" in the position of a link included in the path and "0" otherwise could be reversed, or the bit positions could be counted from the leftmost bit of the bitstring in some embodiments. As another example, although bit positions are numbered herein starting with "1", a numbering system beginning with "0" could be used in other embodiments.

Returning to FIG. 1, another type of link is represented by bit position 6. This position is assigned to a two-way direct link between BFR C and BFR E, as indicated by the two-way arrow adjacent to the bit position numeral, and bit position 12 is assigned to a two-way direct link between BFR D and BFR F. These two-way links are referred to as peer-to-peer (p2p) links Bit position assignments for links associated with BFERs, such as bit position 9 associated with BFR D and bit position 8 associated with BFR F, are indicated by diagonally-upward arrow. The arrow indicates a link to a higher protocol layer in network 100. In particular, the assigned bit position is associated with decapsulation of the BIER-TE packets from the BIER-TE message and passing of the packets to the next higher protocol layer, or to the forwarding protocol used outside of the BIER-TE domain Bit position assignment for the link between BFR A and BFR E in FIG. 1 represents yet another type of network link This link is not a direct link, since the nodes are not directly connected in network 100. In the embodiment of FIG. 1, for example, a message can travel between nodes A and E by going through node B to node E or by going through node B and then node C, and even nodes D and F, to reach node E. For some messages forwarded by node A, it may be important that the message goes through node E, but it may not matter which path to node E the message takes. For such a message, BFIR 118 (BFR A) can construct an explicit path including an indirect link from node A to node E. This indirect link is illustrated in FIG. 1 by a dashed line. This type of indirect link may also be called, for example, a "remote adjacency," a "forward-routed adjacency," or a "loose-hop" link or adjacency. In an embodiment, BFR A implements the message forwarding associated with bit position 11 by using unicast routing information stored in the OBIFT of node A. The path from node A to node E represented by the arrow with bit-position 11 may be determined using a link-state routing protocol such as Intermediate System to Intermediate System (IS-IS) or Open Shortest Path First (OSPF) based on information about the network topology stored in the OBIFT of BFR A.

The bit position assignments shown in FIG. 1 are used to describe the explicit path to be taken by a multicast message. For example, a path ABEF through the network is made up of links having bit positions 1, 4 and 5. A 12-bit bitstring carried by a message assigned to path ABEF can be denoted {0000 0001 1001}. Path ABCD is made up of links having bit positions 1, 2 and 3, resulting in a bitstring for the path denoted {0000 0000 0111}.

The TABLE below shows a data model of BIER-TE topology information for a BIFT (OBIFT and/or CBIFT) of a particular BFR. The BFER is represented by the string <SD,BSL,SI,NAME>, where SD is the sub-domain, BSL is the bitstring length, SI is the set index and NAME is an optional name for the BIFT. Unless otherwise noted here and further below in the text, both the configuration and operational BIFTs are configured on the node, for example via a YANG model, and are flooded by an IGP or similar mechanism to other nodes in the BIER-TE domain.

TABLE

<SD,BSL,SI,NAME>
<BFR ID>
member <list of ingress groups>
for each bit in the bitstring,
    <BITINDEX>
    <BITTYPE>
    for each adjacency:
    local_decap
    forward_connected:
        <ROUTER-ID>
        <LINK-ID>
        <DNR>
    forward_routed:
        <DESTINATION-ROUTER-ID>
    equal_cost_multipath:
        list of two or more forward_connected
        and/or forward_routed adjacencies The example TABLE includes topology information for the subdomain 130. This information identifies the type and adjacency of all of the interfaces in the subdomain 130. Alternatively, the BIFT may only identify the types and adjacencies of the interfaces of the BFR. In this instance, information on the topology of the network is available via an IGP topology flooded from other nodes in the network.

In the TABLE, BFR ID is an optional name assigned to the BFR. The list of ingress groups is a list of the multicast groups, identified by their respective ingress nodes, that include the BFR as a member of the group. The example BIFT shown in the TABLE includes parameters for each link or interface in the subdomain (or for each interface of the BFR). For each such interface, the BITINDEX parameter is the bit-number of the bit representing the interface in the bitstring. the BITTYPE parameter indicates the type of interface. The BITTYPE value may indicate several different interface types. Example BITTYPE values include "unassigned," "unique," "p2p," "group," "flood," "lan," "leaf," "ingress announce," and "BIER announce."

A BITINDEX having the BITTYPE "unassigned" indicates that the BITINDEX value has not been assigned to any interface. The "unique" BITTYPE indicates that the bit is used for only one interface in the subdomain The "p2p" BITTYPE indicates a peer-to-peer interface which, for example, indicates a two-way physical connection between two BFRs. Thus, each of these two BFRs may have an interface with the same BITINDEX, representing the two sides of the link between the two BFRs. The BITTYPE "group" identifies an interface to multiple BFRs that are configured to be in the same multicast group. This BITTYPE exists only in the configuration instance of the BIFT (CBIFT). The BITTYPE "flood" is the counterpart for the "group" BITTYPE in the operational instance of the BIFT (OBIFT). The "group" BITTYPE indicates an interface that is configured to send replicated packets via the interface while the "flood" BITTYPE indicates an interface that is capable of sending the replicated packets. The "lan" BITTYPE indicates that the interface is an interface to a number of nodes that are not BFRs. These nodes may be nodes in a local area network (LAN). The "leaf" BITTYPE indicates an interface to an egress router (e.g., a BFER). The "ingress announce" BITTYPE is used, as described below, to use forward-routed adjacencies to reduce the number of BITINDEX values used in a subdomain The "BIER announce" BITTYPE is used, as described below, at a border between the BIER-TE subdomain and a BIER subdomain to implement a hybrid BIER/BIER-TE subdomain to reduce traffic flow through individual interfaces.

After the BITTYPE field, the TABLE lists one or more adjacency parameters that are associated with the BITINDEX. As described above, for example, the BITINDEX may have a BITTYPE "group" or "flood" indicating that the BITINDEX is associated with multiple interfaces, also referred to as adjacencies, each to a respective member of a multicast group. In this instance, the BIFT indicates parameters for each of the adjacencies. The "local_decap" parameter indicates that the adjacency is to a BFER which decapsulates the BIER-TE message to provide the packet data to a network node that is not a BIER-TE node, such as one of the CE nodes 110, 112, 114, or 116 shown in FIG. 1. The "forward_connected" parameter indicates whether the adjacency is a physical connection to another BIER-TE node. When an adjacency is identified as "forward_connected," the corresponding entry includes three values, the ROUTER-ID, identifying the router to which the interface is connected, "LINK-ID" indicating a name for the interface, and "DNR" indicating that the BITINDEX in the routing bitstring of the message corresponding to the interface is not to be reset when the BIER-TE message is sent through the interface.

The "forward_routed" parameter indicates that the adjacency is a remote adjacency or loose-hop adjacency. for each forward-routed adjacency, the DESTINATION-ROUTER-ID identifies the destination router for the adjacency. The path from the current router to the destination router is calculated from the IGP topology as the shortest path between the two nodes. No traffic engineering is performed on a forward-routed adjacency. The "equal_cost_multipath" parameter indicates that the adjacency represents multiple paths having equal cost and that one of these paths is selected randomly or based on predetermined criteria.

The CBIFT and the OBIFT leverage the pre-existing IGP network topology that describes which interfaces of which 131-Rs are connected to each other. This pre-existing network topology is the reason why the BIER-TE topology information is well suited to be distributed via the IGP. Although the examples refer to IGP, in another example embodiment, the BIER-TE topology information could be flooded through a different protocol, as long as a topology similar to the IGPs network topology is available via this different protocol. Alternative protocols for flooding include STP (spanning tree protocol) in switched level 2 (L2) networks or unicasting the topology information via an SDN controller that is configured to unicast the topology information to every node. As described above, the CBIFT describes what has been configured on the BFR(s). and the OBIFT describes what the BFR(s) are using operationally. Flooding the network with CBIFT and OBIFT via the IGP allows distributed mechanisms to access configuration information and make distributed decisions about how to translate configuration into the operational state. Example mechanisms for this are described in more detail below.

The information in the example BIER-TE topology may be extended by operational applications running on the BFR. In one example, an application uses a YANG model to create BFR entries in the BIER-TE topology including the new bit types, described above, for the BITINDEXes in the bitstring representing both the forward-connected and the forward-routed adjacencies in the network. This allows applications running on other BFRs to use the same YANG model to retrieve this information and perform calculations resulting in the example BIFTs.

Because the BIER-TE BFRs use the IGP flooded network topology, each BIER-TE BFR may automatically calculate paths through the network. In other protocols, not every node may calculate paths through the network. For example, in RSVP-TE, the ingress Link-State Router (LSR) into an RSVP-TE domain calculates the path through the topology for a specific RSVP-TE path using a variety of available information. The ingress LSR then signals the path to other nodes in the network using RSVP-TE signaling which includes a set of hop-by-hop or loose hop-by-hop LSR links through which the path should pass. No signaling is needed to set up a path for Segment Routing in an LSR. Instead, every data packet includes a sequence of Segment IDs indicating the hop-by-hop or loose hop-by-hop LSRs through which the packet is to be forwarded. If an interface along the path fails, however, the data packets may be lost. Because each BFR in the example embodiment can reroute BIER-TE messages, a BFR encountering a failed interface can route the messages around the failed interface.

In an embodiment, each BIER-TE node determines topology information for the network from received IGP messages and may use this information to generate/update the configuration and operational BIER-TE topologies (e.g., CBIFT and OBIFT). The BFR may use the operational topology to calculate feasible paths for BIER-TE traffic and to determine the bits that need to be set for a path.

In a network including nodes that operate according to the BIER-TE standard, the BFIR node may not be able to determine which paths are possible, using only the network topology because the topology corresponds to the configuration topology not the operational topology. The topology used by current BIER-TE BFIR nodes does not include information on links that have failed or are too congested to accept new traffic. In addition, the configuration topology may have internal inconsistencies. The example BIER-TE BFIR nodes described herein use information from the flooded BIER-TE topology to construct/maintain both the configuration instance (CBIFT) and the operational instance (OBIFT) of the Bit Indexed Forwarding Table.

Not every node in the network may support BIER-TE. Some nodes may be bypassed by BIER-TE to reduce the number of bits in the bitstring. These nodes are not required to run BIER-TE because, for example, they do not replicate messages for multicast communications. In an example embodiment, the CBIFT is set up initially, either manually or automatically, before BIER-TE traffic is applied to the network. The CBIFT is copied to generate the OBIFT. Any non-BIER-TE node is identified in the CBIFT and, thus, in the initial OBIFT. The OBIFT may employ the "forward_routed" adjacencies, described above, to "tunnel" BIER-TE traffic via such non-BIER-TE nodes.

A BFR constructs the CBIFT from the available BIER-TE topology and possible paths through it, by using the BIER-TE topology information from all BFRs in the network. As described above, this topology information is flooded to all of the BFRs in the network via the IGP. Each BFR represents a vertex of the topology and each adjacency represents an edge. For example, the BFR "B" represents a group of directed edges (adjacencies) from a BFR having a BFR ID of "B" towards the destinations of those adjacencies. Each vertex group can be thought to have a name B<SI,SD>N, where "B" is the name of the BFR, SI is the Set Index, SD is the SubDomain of the BIFT, and N is the BITINDEX of the bit for this set of adjacencies on the BFR B. All bits of all BFRs within the same <SI,SD> form one BIER-TE topology. Each BFR may have multiple sets of OBIFTs and CBIFTs each for a different Set Index and SubDomain (<SI,SD>), therefore multiple topologies may exist, each having a different bitstring.

Figure 2A:
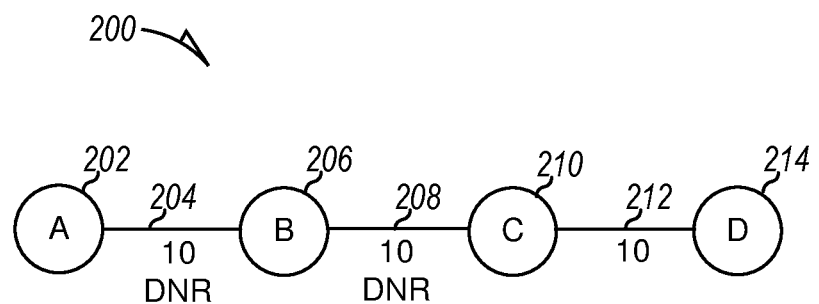
FIGS. 2A, 2B, and 2C are network diagrams showing portions of a network domain according to example embodiments.

Once a BFR node (e.g., a BFIR) has calculated a desired path for a message through the topology, the BFR generates the bitstring for the packet. The bitstring includes a set bit for every adjacency in the path from the BFR up to and including the adjacency to the BFER node. As described above with reference to FIG. 1, packets are encapsulated by a BFIR into a BIER-TE message which includes the bitstring in its header. As the BIER-TE message is routed through the network, each BIER-TE BFR may reset or remove the bit corresponding to the adjacency from which it was received. This operation prevents the BFRs from routing the BIER-TE message sequentially through multiple adjacencies having the corresponding to the same bit (e.g. looping the BIER-TE message through the same set of BFRs). An exception to this operation occurs when the BITINDEX in the BIFT is used for multiple sequential adjacencies. This may be done to save bits in the bitstring by using the same bit for multiple adjacencies. To prevent these adjacencies from being reset before the message has reached its destination BFR, the BITINDEX in the BIFT is marked DNR. In this instance, the topology treats such bits as a representation of an edge-group to the transitive closure of the BFRs. This is illustrated in FIG. 2A.

In this topology, node A 202 has an interface 204 to node B 206 which is connected by an interface 208 to node C 210 which, in turn, is connected by interface 212 to node D 214. In this topology, all of the interfaces 204, 208, and 212 convey the same BIER-TE messages and, to save bits in the bitstream, all of the links are assigned the same BITINDEX. In this example, all of the interfaces are assigned a BITINDEX of 10. In this example, the OBIFT for BFR 202 lists the interface 204 as a forward connected adjacency having a BITINDEX of 10, a ROUTER-ID of BFR B, a LINK-ID of AtoB, and has DNR set Similarly, the OBIFT for BFR 206 lists the interface 208 as having a BITINDEX of 10, a ROUTER-ID of BFR C, a LINK-ID of BtoC, and has DNR set. The OBIFT of BFR 210 lists the interface 212 as having a BITINDEX of 10, a ROUTER-ID of BFR D, a LINK-ID of CtoD, and has DNR reset. A message having bit 10 set in its routing bitstream traverses links 204, 208 without resetting bit 10. BFR D 210 resets bit 10 when it receives the message over interface 212.

Because the BIER-TE topology information has both operational and configuration instances, it may be used to verify consistency of topology information and to compensate for inconsistencies. Various mechanisms may be used to deal with inconsistencies.

The example BIER-TE topology information configured on every BFR includes the element of a logical BITTYPE and in some cases one or more bit group names (e.g., the LINK-ID when the BITTYPE is "group" or "flood"). This type and name information is not required to calculate the paths available through the topology. The available paths may be determined using the adjacencies, as described above. Instead, the BITTYPE and LINK-ID fields provide additional "metadata" for the BITINDEX which serves to verify consistency of configured bits with their "intent." In example embodiments, "intent" means that the BITTYPE and LINK-ID describe the operational purpose of a bit which implies specific ways how the bit should be configured in the topology:

For example, a BITINDEX having a type "unique" should only occur on one BFR in the topology, all other BFR should have no adjacency for that bit. Furthermore, a BITINDEX having a type "p2p" should have a corresponding BITINDEX in the BFR to which it points.

Any BFR may use the currently known BIER-TE topology information to check any newly entered BIER-TE topology information against the information maintained in the local BIFT for the BFR. When information on a BITINDEX is entered that would conflict with information associated with an existing BITINDEX, an example application running on the BFR may flag the inconsistency and may prohibit this configuration or warn the operator or system providing this configuration. The configured use of the bit may be maintained in the configuration instance of the BIFT but not transferred to the operational instance of the BIFT until the conflict is resolved. For example, the current BIFT of a first BFR has an BITINDEX with BITTYPE "p2p" and is forward-connected identifying the ROUTER-ID of a second BFR. When the first BFR receives flooded IGP data indicating that a third BFR identifies the same BITINDEX as "unique," the first BFR may enter the BITINDEX data from the second BFR into its configuration BIFT but not into its operational BIFT.

Similarly, errors in the physical rewiring of the network may lead to problems in network connectivity. An application running on the BFR can detect such an error by performing the BIER-TE topology verification and can either alert the operator of the erroneously rewired BFR and/or inhibit for new connectivity to be used in the operational BIFTs of all of the BIER-TE BFRs.

For example, when two BITINDEXes both having BITTYPEs of p2p bits for a specific p2p LINK-ID are discovered by an application running on a BFR not to point to each other, then the application may declare an erroneous wiring. When the erroneous wiring is discovered, neither of the BFRs linked by the erroneously wired adjacencies should actively use the BITINDEX. The configuration instance of their BIER-TE topology information can still announce the bit, but neither BFR would not populate this bit in the operational instance of its BIER-TE topology information.

The distinction between the BIER-TE configuration and operational flooded BIER-TE topology information allows for distributed, partially automated fast consistent configuration change where the change time between an old and a new configuration is minimized In an example a first BFR, B1, has a BITINDEX having a "unique" BITTYPE, which BFR B1 announces in its configuration and operational state. A second BFR, B2, has been manually configured for the same BITINDEX which also has the unique BITTYPE. An application running on BFR B2 will discover, from flooded operational BIER-TE topology provided by BFR B1, that it cannot yet use this BITINDEX. BFR B2, accordingly, announces this BITINDEX and BITTYPE in its configuration BIER-TE topology information. BFR B2 does not announce the BITINDEX and BITTYPE in its operational BIER-TE topology information.

Subsequently, this BITINDEX is unconfigured from BFR B1. When BFR B1 floods its updated configuration and operational BIER-TE states, BFR B2 discovers (with minimum delay), that it cannot activate this BITINDEX and announce the BITINDEX both in its operational BIER-TE topology state. This scenario may occur, for example, when nodes in a subdomain are rewired out of order.

Applications running on BFRs may also detect inconsistencies based on path calculation rules for different bit types. For example, a p2p BITTYPE is meant to be used from both BFRs that are connected by a common adjacency between the two BFRs. The p2p BITINDEX has one LINK-ID, and that name should be a unique name for that p2p link The LINK-ID, for example, could be constructed as a concatenation of names of the two BFRs. Because each forward-connected BITINEX also has a LINK-ID, BITINEX values used for forward-connected p2p links may be reused across the topology for any paths where they occur in non-consecutive edges of a path, (e.g., in different branches). This reuse, however, occurs only when the reused BITINDEX values have different names. If an application running on a BFR detects two BIFT configurations having respective p2p BITINDEXes that have the same LINK-ID but are not associated with adjacencies that mutually point to each other, the application may detect an inconsistency. This inconsistency may have occurred because of a change of connectivity or because of a misconfiguration. The application may handle this inconsistency by eliminating one or both of the inconsistent BITINDEXes from the operational BIFT (or IGP) configuration and flooding the network with the updated configuration.

BITINDEXes having a "leaf" BITTYPE may also be used to detect inconsistent configurations. The "leaf" BITTYPE occurs in one BITINDEX per <SI,SG> BIFT. This BITINDEX, however, may be re-used across all BITINDEXes having adjacencies pointing to a BFER. A "leaf" BFR cannot be a "transit" BFR. No path must be calculated that has a "leaf" BFR as a non-leaf vertex of the path graph. If the example application running on the BFR detects a BITINDEX having an a "leaf" BITTYPE and having an adjacency that does not point to a BFER, the application removes the BITINDEX from the operational BIFT.

A "lan" BITYPE is associated in the BIFT with a BITINDEX having a LINK-ID that identifies the LAN uniquely in the overall network topology. In an example network, the BITINDEX is assigned to adjacencies across a single LAN in the underlying network topology. If the configured topology shows inconsistent configuration, then the BITINDEX is not used in the operational BIFT, except as described below.

Whenever consistent configuration of bits across multiple BFR is required, the IGP can be used to autoconfigure at least some of the BITINDEXES in BIFTs to minimize the use of inconsistently configured entries. For example, if, as described above, a BITINDEX having a "lan" BITTYPE is inconsistently configured, instead of not using that BITINDEX, auto-consistency, as applied by the application running on the BFR, allows the BFRs to use the BITINDEX in a consistent subset of configurations. In example embodiments, a consistent subset of configurations is a set of BFRs that have the BITINDEX configured with the same name wherein the adjacencies for the BITINDEXes mutually point to other BFRs in the set of BFRs. Each BFR in the set of BFRs may individually configure these adjacencies to be operational.

Alternatively, the BFRs in the LAN may elect one BFR to be a master. In an example system, a LAN may be configured using an existing master election mechanism in the IGP. When a LAN uses a master election mechanism, a BFR connected to "lan" BFR will not try to determine whether to make the BITINDEX having the "lan" BITTYPE operational if the adjacency does not point to the master BFR. Instead, the BFR connected to the BFR identifies the operational state of the BITINDEX of the master BFR and then operationally enables the same BITINDEX for the "lan" BFR as the master. The use of a master algorithm allows for more consistent configurations. It also reduces the overhead of performing a full topology analysis by all BFRs in the LAN to discover inconsistent configurations. In this example, the task of discovering inconsistent configuration is performed only by the master BFR of each LAN.

Figures 3A, 3B:
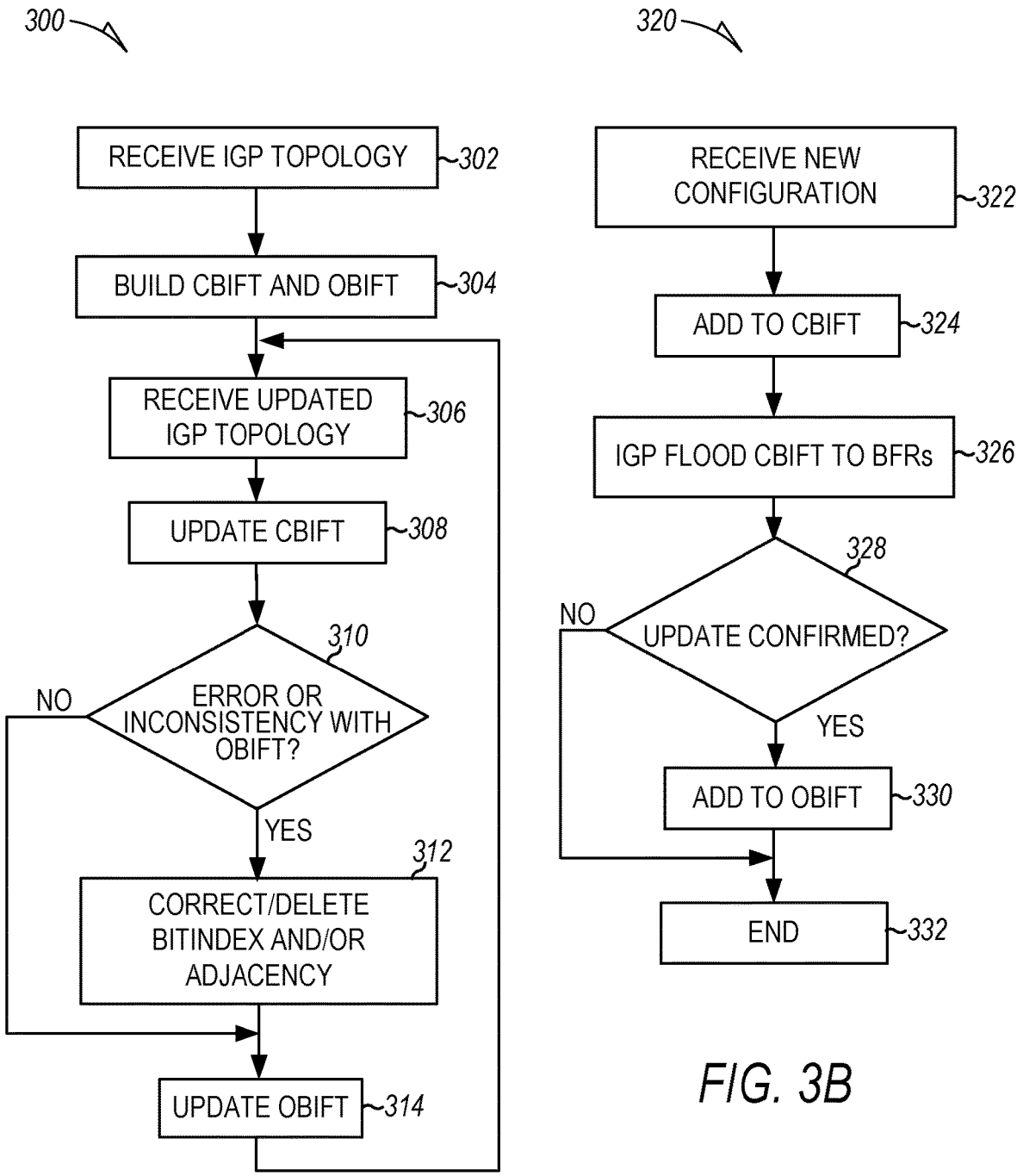
FIGS. 3A, 3B, 3C, and 3D are flowchart diagrams showing methods used in example embodiments.

FIGS. 3A and 3B are flowchart diagrams that illustrate the methods 300 and 320 which are executed by a BFR in building and maintaining the CBIFT and OBIFT. The method 300 begins at operation 302 when the BFR receives the IGP topology. At operation 304 the BFR builds the CBIFT from the received topology and copies the CBIFT to generate the OBIFT. At operation 306, the BFR receives updated IGP topology information and at operation 308 updates the CBIFT. At operation 310, the example BFR performs BIER-TE topology verification to determine if there is an error or inconsistency in the CBIFT or if the CBIFT is inconsistent with the OBIFT. If operation 310 identifies an error inconsistency, operation 312 attempts to correct the error or inconsistency and/or deletes the erroneous BITINDEX value and/or adjacency. At operation 314, the BFR updates the OBIFT with the updated IGP topology if no error or inconsistency was detected by operation 310 or with the corrected information generated by operation 312. After operation 314, the method branches back to operation 306 to receive the next updated IGP topology.

FIG. 3B shows a method 320 which is run when a BFR is reconfigured. A BFR may be reconfigured, for example, by an operator rewiring one or more of the ports of the BFR. At operation 322, the BFR receives the new configuration and adds it to the CBIFT. At operation 326, the BFR floods the CBIFT to other BFRs in all of the subdomains of which the BFR is a member. The BFR, at operation 328, receives flooded IPG information from another BFR. If the updated configuration is in the received OBIFT configuration, the updated configuration is confirmed and, at operation 330, the BFR adds the updated information to the OBIFT. At operation 332, the operation ends either without updating the OBIFT if the updated configuration is not confirmed at operation 328 or with the OBIFT updated by operation 330 if the updated configuration is confirmed.

Using forward_routed adjacencies to traffic engineer over loose hop paths with BIER-TE may save many BITINDEX values in the BIFTs for a subdomain A model to support IGP assisted automated building of forward_routed adjacencies for BITINDEXes is described below with reference to the network 220 shown in FIG. 2B using the method 340 shown in FIG. 3C.

In this example, an operator wants to ensure that traffic from multiple sources 222 in group A (BFRs A1-A10) to multiple receivers 228 in group D (BFRs D1-D100) follows paths that can be steered through one BFR 224 in group B (BFRs B1-B3) followed by one or more BFRs 226 in group C (BFRs C1-C3) before reaching multiple BFRs 228 in group D. Even if traffic is to be replicated to more than one BFR in each of group B and group C. In this example, the operator has determined from the overall topology that it is sufficient just to use forward_routed adjacencies and therefore save bits for all the connections up to group C. Assume for example that in addition to the ten source BFR 222 in group A, there are more BFR 226 than are shown in FIG. 2B as being in in group C. An example method 340, shown in FIG. 3C, to automate consistent setup of forward_routed bits across this topology with the IGP is described below.

In the example method 340, a BFR announces a particular bit (uniquely assigned to the BFR) with the name of one or more ingress groups of BFRs that should use this bit for a forward adjacency towards the announcing BFR. Every BFR in this example is pre-configured to be member of one or multiple ingress groups and only reacts to announcements for ingress groups of which it is a member. the BFR that received the announcement then sets up the announced bit entry for a forward_routed adjacency towards the announcing BFR. This may be a forward-connected adjacency if the BFR that received the announcement determines that it is directly connected to the announcing BFR.

The use of an ingress group ensures that BIER-TE forwarding will be autoconfigured correctly. If members 226 of group C in FIG. 2B announce a bit, it would be undesirable if a BFR 222 in group A would create the bit entry towards that group C BFR 226 because that operation would eliminate the ability for a BIER-TE bitstring to indicate a traffic-engineered forwarding path through, for example, exactly one member of group B 224 and then for example exactly two members of group C 226. If the group A BFR 222 already has the bits with forwarding adjacencies for the BFRs 226 in group C, it would immediately forward copies of the packet to those adjacencies, removing the ability to engineer the path across a specific group B BFR 224.

Figure 2B:
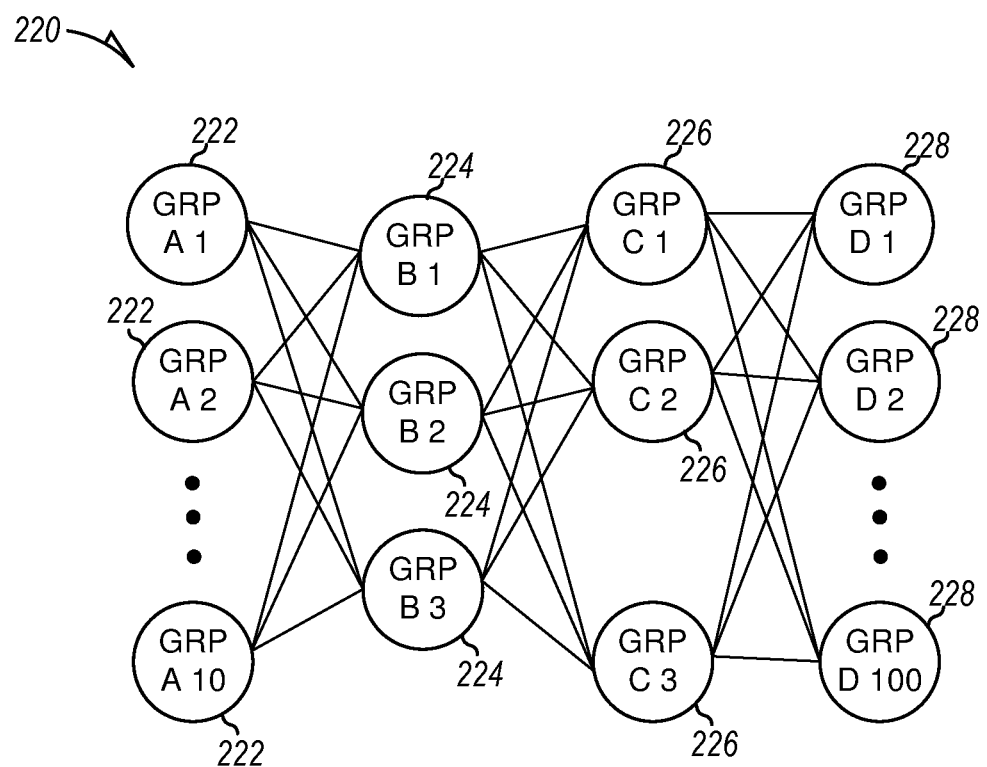

In the example shown in FIG. 2B therefore each of the group C BFRs 226 can be configured with a unique bit each (three bits total across BFRs B1, B2, and B3) to announce to the ingress group B BFRs 224, and the group B BFRs 224 would be configured with a unique bit each announced for the group A BFRs 222.

Figures 3C, 3D:
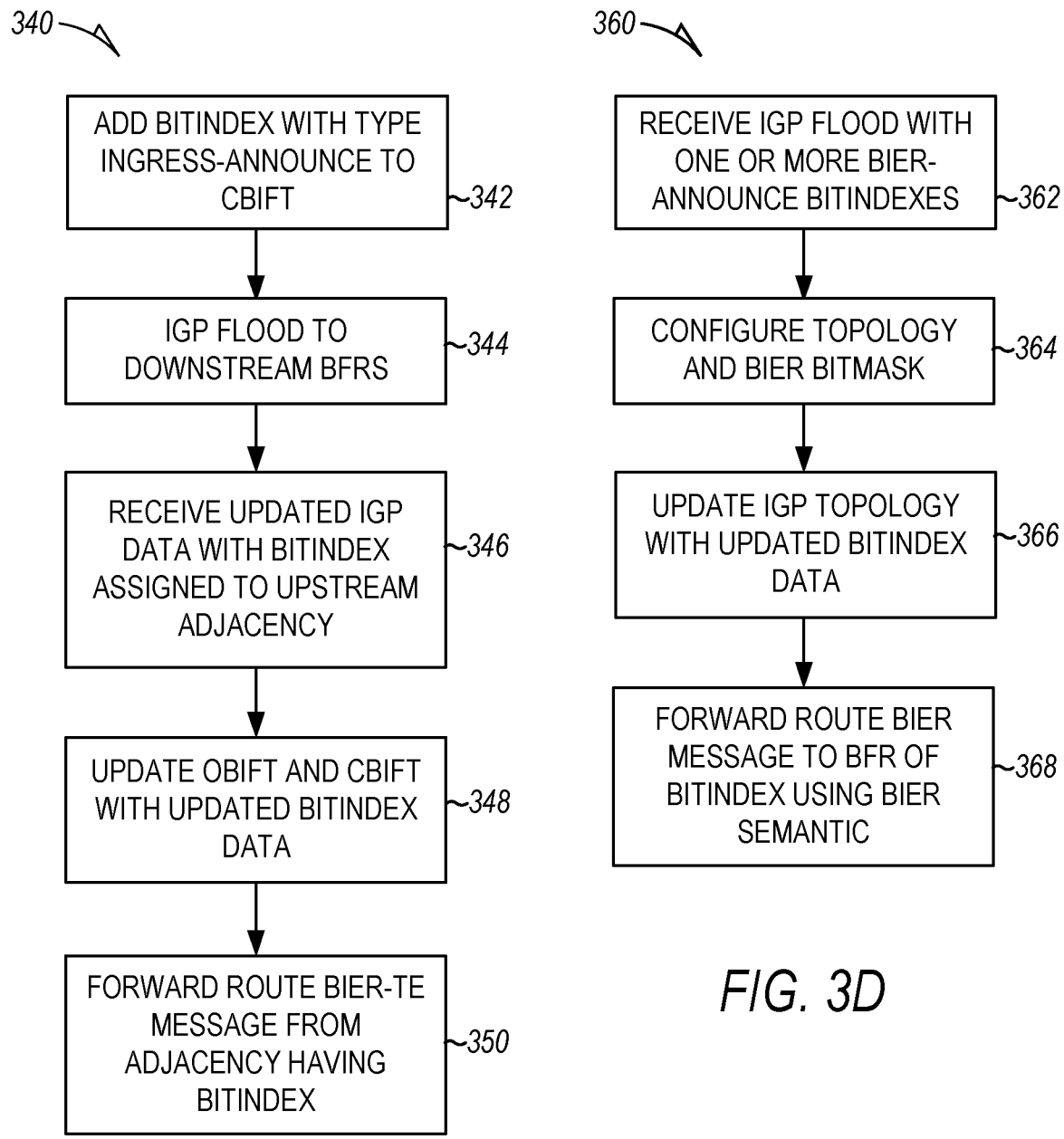

In the network 220 shown in FIG. 2B, an example BIFT could have BITINDEX with a BITTYPE designated "ingress-announce" as shown by operation 342 of FIG. 3C. The BITINDEX may be associated with the list of ingress group names (not shown in the TABLE). This "ingress-announce" bit would have no adjacencies. At operation 344, the BFR floods this BITINDEX the BFRs using IGP. A BFR belonging to one of the announced groups discovers this BITTYPE from the IGP data and assigns this bit to the best possible forwarding adjacency towards that announcing BFR (forward_routed or forward_connected)—and then announces those BITINDEX values so that the BFIR and other devices in the route know these BITINDEXES and adjacencies as part of the BIER-TE topology. In operation 364, the BFR receives these announced BITINDEXes. The BFR updates the OBIFT and CBIFT with the updated BITINDEXes at operation 348. At Operation 450, the BFR receives BIER-TE messages from the adjacency having the announced BITINDEX and forwards these messages to the next adjacency in the bitstream.

Figure 2C:
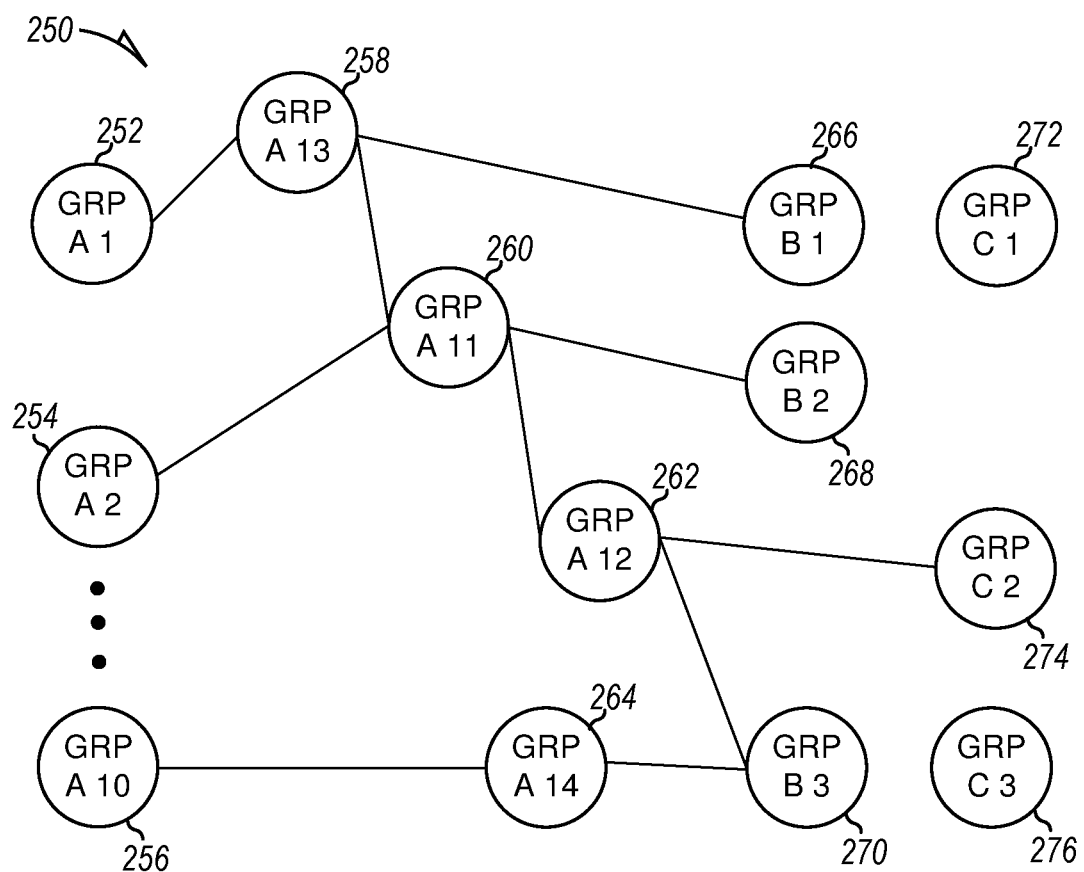

In the example shown in FIG. 2B, automatically established adjacencies can be unicast between sources 222 in group A and receiver nodes 224 in group B. FIG. 2C shows an example topology of a network 250 which is similar to the network 220 shown in FIG. 2B. In the network 250, if a source BFR 252 in group A wants to send packets via group B BFRs 266, 268, and 270, then these unicast adjacencies would result in three times the traffic on the adjacencies between BFR 252 and BFR 258 in group A and two times the traffic on the adjacencies between BFR 258 and BFR 260 in group A. Furthermore, assigning BITINDEXES of the links between BFRs 252, 254, and BFR 256 in group A on the one hand and BFRs 266, 268, and 270 in group B on the other hand would result in undesired and inefficient use of BITINDEXes in the bitstring.

In an example system, this inefficiency may be resolved by expanding the forwarding model to support a hybrid BIER/BIER-TE model. In the example system, all devices in the network 250 support the hybrid BIER-TE/BIER forwarding model. In this model, a specific bitstring mask indicates the BITINDEXes that are forwarded with BIER semantic The nodes processing messages according to the BIER semantic must not modify or reset the remaining bits, which are forwarded according to the BIER-TE semantic The bits on which a specific BFR performs BIER semantic instead of BIER-TE is determined by the same type of information distributed across the IGP described above. In the example of FIG. 3 BFRs 266, 268, and 270 in group B each announce a BITINDEX having a "bier-announce" BITTYPE and group name "groupA." All of the BFRs 252, 254, 256, 258, 260, 262, and 264 are members of group A. Each of these BFRs determines, through the IGPs network topology, a path to reach the BFR 270 announcing "bier-announce" for "groupA." It is noted that the IGP topology used in this example is different from the BIER-TE configuration and operational topologies. the BFRs 252, 254, 256, 258, 260, 262, and 264 only consider paths transiting through other nodes that are member of the same "groupA". Effectively, all "groupA" members use BIER for three BITINDEXes corresponding to BFRs 266, 268, and 270 in group B. The remaining BITINDEXes in the bitstring are treated as BIER-TE BITINDEXes. Once a message has reached one of the BFRs 266, 268, and 270, it will continue to be forwarded, for example to BFRs 272, 274, and 276, using the BIER-TE semantics configured on those devices. The BITINDEXes assigned to the group B BFRs are not assigned further in the downstream paths. In this example, the BFRs 266, 268 and 270 may themselves be member of a group B for which, as described above, the BFRs 272, 274, 276 of group C announce BITINDEXes having BITTYPE "ingress announce."

In FIG. 2C, one BFR 262 in group A may have both BIER BITINDEXes and BIER-TE BITINDEXes that are active, for example, a BIER-TE BITINDEX having an adjacency that is forward-connected towards BFR 274 of group C. For BFR 262 in group A to be reachable from BFR 270 in Group B BFR 270 should also announce a "bier-announce" type bit for "groupA".

FIG. 3D is a flowchart diagram showing a method 360 that may be executed by a BFR that receives a BITINDEX having a type BIER-announce. At operation 362, the BFR receives an IGP flood with one or more BITINDEXes having type BIER-announce. At operation 364, the BFR configures its topology to indicate that network nodes upstream of the BFR that announced the BITINDEX with type BIER-announce are BIER nodes and that the announcing node and network nodes downstream of the announcing node are BIER-TE BFRs. Operation 364 also generates the BIER bitmask, described above to indicate which BFRs are BIER and which are BIER-TE. Operation 366 then updates the IGP topology with this BITINDEX data. At operation 368, the BFR determines a BIER forward-routing path to the BIER-TE BFR using the BIER semantic and routes the BIER message through that path.

Figure 4:
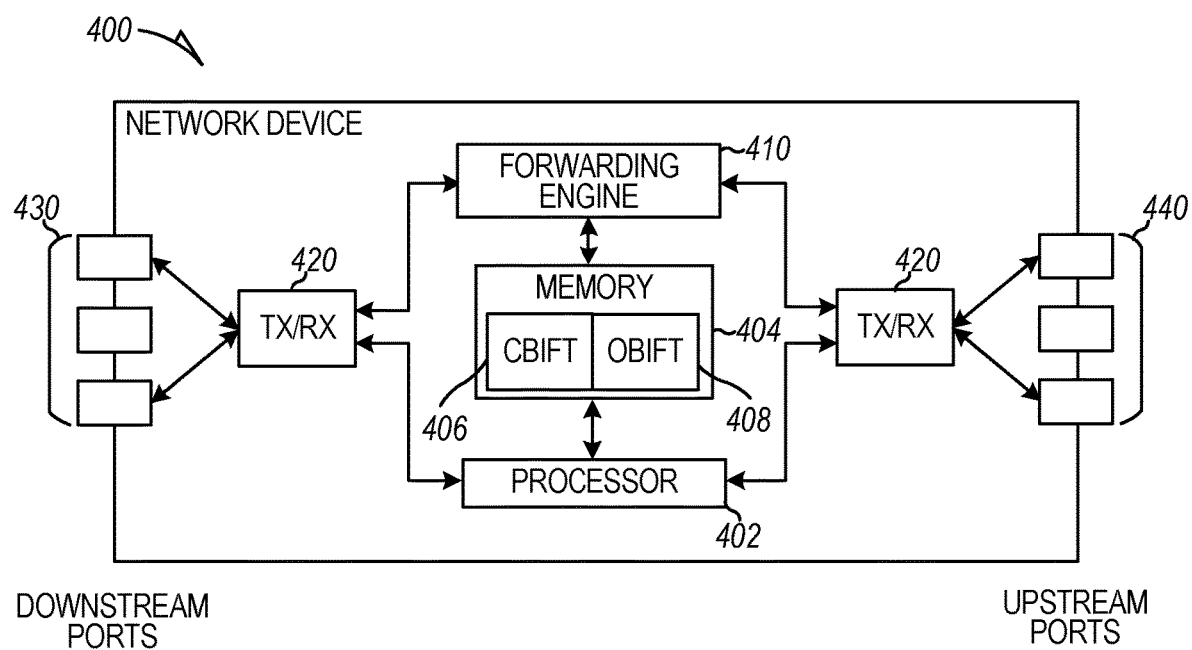
FIG. 4 is a schematic diagram of a bit-forwarding router (BFR) network device according to example embodiments.

FIG. 4 is a schematic diagram of an example BFR network device 400 for encapsulating/decapsulating packets and/or transferring BIER and/or BIER-TE messages through a network. For example, network device 400 may implement an edge node such as BFR 118, 124, 126, or 128 and/or an internal node such as BFR 120 or 122 in the network domain 130. Further, the network device 400 can be configured to implement method 300, 320, 340, and/or 360, described above with reference to FIGS. 3A-3C, as well as other methods/mechanisms/applications disclosed herein. For example, the network device 400 can transmit BIER-TE messages with a data packet header containing a BIER-TE bitstring.

Accordingly, the network device 400 may be configured to implement or support the schemes/features/methods described herein. For instance, the features/methods in the disclosure may be implemented using hardware, firmware, and/or software, including the applications described above, installed to run on the BFR. One skilled in the art will recognize that the term network device encompasses a broad range of devices of which network device 400 is merely an example. Network device 400 is included for purposes of clarity of discussion but is in no way meant to limit the application of the present disclosure to a particular network device embodiment or class of network device embodiments.

The network device 400 may be a device that communicates electrical and/or optical signals through a network, (e.g., a switch, router, bridge, or gateway). As shown in FIG. 4, the network device 400 may comprise transceivers (Tx/Rx) 420, which may be transmitters, receivers, or combinations thereof. A Tx/Rx 420 may be coupled to a plurality of downstream ports 430 (e.g., downstream interfaces or adjacencies) for transmitting and/or receiving frames from other BFR nodes and a Tx/Rx 420 may be coupled to a plurality of upstream ports 440 (e.g., upstream interfaces or adjacencies) for transmitting and/or receiving frames from other BFR nodes, respectively. A forwarding engine 410 may be coupled to the Tx/Rxs 420 to process the BIER-TE messages and/or determine which of the adjacencies 430 and/or 440 received BIER-TE messages are to be routed, based on the bitstrings in the message headers and the connectivity of the BFR in the OBIFT 408. The example network device 400 also includes a processor 402, which may comprise one or more multi-core processors and/or memory devices 404, that may function as data stores, buffers, and may include the CBIFT 406 and OBIFT 408 as well as storage (not shown) for a received IGP topology. The memory 404 may also contain program instructions for one or more of the applications, described above, which control the forwarding engine 410 to implement the methods and processes described above.

Processor 402 may be implemented as a general processor or may be part of one or more Graphics Processing Units (GPUs), Network Processor Units (NPUs), application specific integrated circuits (ASICs), and/or digital signal processors (DSPs).

The forwarding engine 410 may be implemented in a general-purpose processor, a field programmable gate array (FPGA), an ASIC (fixed/programmable), a network processor unit (NPU), a DSP, and/or a microcontroller. In alternative embodiments, the forwarding engine 410 may be implemented in processor 402 as instructions stored in memory device 404 (e.g., as a computer program product), which may be executed by processor 402, and/or implemented in part in the processor 402 and in part in the memory device 404. The downstream ports 430 and/or upstream ports 440 may contain wireless, electrical and/or optical transmitting and/or receiving components, depending on the embodiment.

Memory 404 may include volatile memory and/or non-volatile memory. Network node 400 may include—or have access to a computing environment that includes—a variety of computer-readable media, such as volatile memory and non-volatile memory, removable storage devices and non-removable storage devices. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The network node 400 may include or have access to a computing environment that includes an input interface, an output interface, and a communication interface. The output interface may include a display device, such as a touchscreen, that also may serve as an input device that allows a user to enter configuration information for the network node 400. The input interface may include one or more of a touchscreen, touchpad, mouse, keyboard, one or more device-specific buttons, one or more sensors integrated within or coupled via wired or wireless data connections to the network node 400, and/or other input devices. The network node 400 may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks.

Computer-readable instructions stored on a computer-readable medium are executable by the processor 402 of the network node 400, such as the BIER-TE applications described above. The forwarding engine 410 in some embodiments comprises software that performs network switch operations according to the BIER-TE and/or BIER semantics as described herein. A hard drive, CD-ROM, and RAM are some examples of articles including a non-transitory computer-readable medium such as a storage device. The terms computer-readable medium and storage device do not include carrier waves to the extent carrier waves are deemed too transitory.

Figure 5:
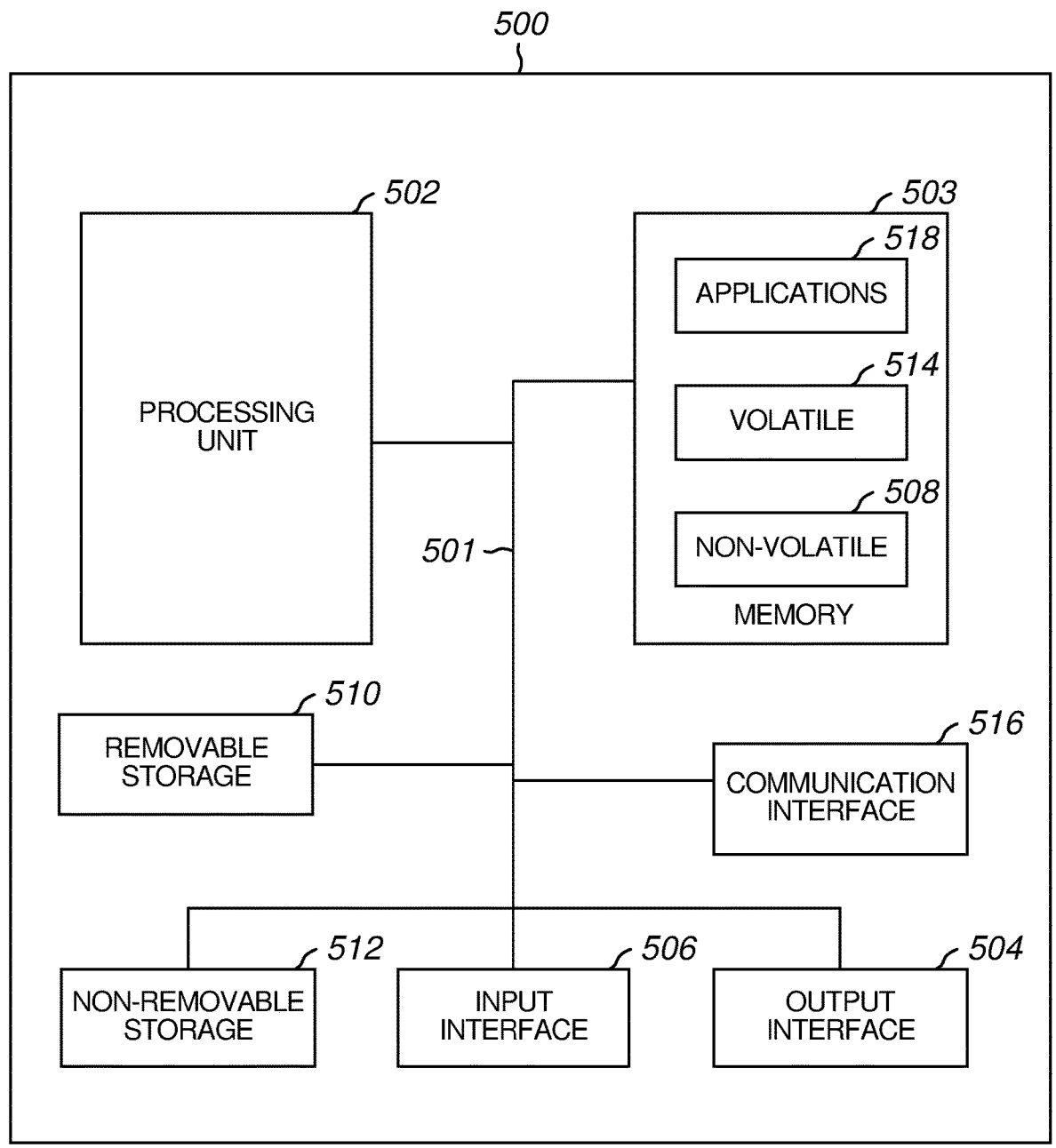
FIG. 5 is a block diagram illustrating circuitry for computing devices for implementing algorithms and performing methods according to example embodiments.

FIG. 5 is a block diagram illustrating circuitry for computing devices 102, 104, 108, or 108 (e.g., clients, servers, or network cloud-based resources) or the customer edge nodes 110, 112, 114, or 116 for implementing algorithms and performing methods according to example embodiments. All components need not be used in various embodiments. For example, the clients, servers, and network resources may each use a different set of components, or in the case of servers, for example, larger storage devices.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, or other computing device. Devices, such as smartphones, tablets, and smartwatches, are generally collectively referred to as mobile devices or user equipment. Further, although the various data storage elements are illustrated as part of the computer 500, the storage 510 may also or alternatively include cloud-based storage accessible via a network 104, such as the Internet, or server-based storage.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), digital versatile disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may provide an interface to a display device, such as a touchscreen, that also may serve as an input device. The input interface 506 may provide an interface to one or more of a touchscreen, touchpad, mouse, keyboard, camera, one or more device-specific buttons, one or more sensors integrated within or coupled via wired or wireless data connections to the computer 500, and/or other input devices. The computer 500 may operate in a networked environment using a communication interface 516 to connect to one or more network nodes, remote computers, such as database servers. The remote computer may include a personal computer (PC), server, router, network PC, a peer device or other common network node, or the like. The communication connection may include a local area network (LAN), a wide area network (WAN), cellular, Wi-Fi, Bluetooth, and/or the network 130, shown in FIG. 1.

Computer-readable instructions stored on a computer-readable medium are executable by the processing unit 502 of the computer 500. A hard drive, CD-ROM, RAM, and flash memory are some examples of articles including a non-transitory computer-readable medium such as a storage device. The terms computer-readable medium and storage device do not include carrier waves to the extent carrier waves are deemed too transitory.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

What is claimed is:

1. An apparatus for use in a first node of a network including a plurality of Bit Index Explicit Replication Traffic Engineering (BIER-TE) enabled nodes, the apparatus comprising:
    a first interface to a second node of the plurality of nodes;
    a memory including program instructions, a configuration bit index forwarding table CBIFT) containing a configuration topology of the network, and an operational bit index forwarding table OBIFT) containing an operational topology of the network; and
    a processor, coupled to the memory, the program instructions configuring the processor to:
    receive first network topology information;
    update the configuration topology with the first network topology information;
    verify the updated configuration topology for consistency with the operational topology;
    update the operational topology with the first network topology information responsive to the verification finding consistency;
    receive a BIER-TE packet including a routing bitstring having a set bit at a first bit index corresponding to the first interface; and
    route the BIER-TE packet to the second node based on the routing bitstring and the updated operational topology.

2. The apparatus of claim 1, wherein the received first network topology information includes a bit index assignment for a second interface of the first node, and wherein the program instructions further configure the processor to:
    determine that a conflicting bit index assignment exists in the operational topology; and
    in response to determining that a conflicting bit index assignment exists in the operation topology, configure the processor not to enter the received bit index assignment in the operational topology.

3. The apparatus of claim 2, wherein the program instructions further configure the processor to:
    determine that the conflicting bit index assignment no longer exists in the operational topology; and
    in response to the determination that the conflicting bit index assignment no longer exists in the operation topology, update the operational topology to include the received bit index assignment from the configuration topology.

4. The apparatus of claim 1, wherein the received first network topology information indicates failure of a second interface of the first node, and wherein the program instructions further configure the processor to:
    not update the configuration topology to indicate the failure of the second interface of the first node; and
    remove the second interface of the first node from the operational topology.

5. The apparatus of claim 1, wherein the received first network topology information includes a connectivity change from a third node in the network, and wherein the program instructions further configure the processor to:
    determine that the received connectivity change indicates a wiring misconfiguration; and
    not enter the received connectivity change from the third node in the operational topology.

6. The apparatus of claim 1, wherein an entry in the operational topology corresponding to the first interface has a first bit type parameter and the received first network topology information includes configuration information for a second interface of the second node, the second interface of the second node corresponding to the first interface of the first node, the second interface having a second bit type parameter, and wherein the program instructions further configure the processor to:
    determine that the first bit type parameter is not consistent with the second bit type parameter; and
    not enter the received configuration information for the second interface of the second node in the operational topology in response to the determination that the first bit type parameter is not consistent with the second bit type parameter.

7. The apparatus of claim 1, wherein the received first network topology information includes topology information for a plurality of interfaces of a respective plurality of nodes, and wherein the program instructions further configure the processor to:
    determine that the plurality of interfaces include a first set of interfaces having consistent parameters and a second set of interfaces having inconsistent parameters; and
    not update the operational topology with the topology information for the second set of interfaces in response to the determination that the second set of interfaces have inconsistent parameters.

8. The apparatus of claims 1, wherein the first network topology information includes a second bit index having parameters indicating a third node and an ingress group of which the first node is a member, and wherein the program instructions further configure the processor to:
    determine a forward-routed path from the first node to the third node; and
    update the configuration topology to include a second interface having parameters indicating the second bit index and the forward-routed path; and
    include the second interface having parameters indicating the second bit index and the forward-routed path.

9. The apparatus of claim 1, wherein the program instructions further configure the processor to receive Interior Gateway Protocol (IGP) data as the first network topology information.

10. The apparatus of claim 1, wherein the program instructions further configure the processor to receive a Bit Index Explicit Replication Traffic Engineering (BIER-TE) packet including the routing bitstring, bits in the routing bitstring corresponding to links in the OBIFT and the CBIFT.

11. A method for use in a first node of a network including a plurality of Bit Index Explicit Replication Traffic Engineering (BIER-TE) enabled nodes, the first node having a first interface to a second node and network topology information including a configuration bit index forwarding table CBIFT) containing a configuration topology of the network, and an operational bit index forwarding table OBIFT) containing an operational topology of the network the method comprising:

receiving first network topology information;

updating the configuration topology with the first network topology information;

verifying the updated configuration topology for consistency with the operational topology;

updating the operational topology with the first network topology information responsive to the verification finding consistency;

receiving a BIER-TE packet including a routing bitstring having a set bit at a first bit index corresponding to the first interface; and routing the BIER-TE packet to the second node based on the routing bitstring and the operational topology.

12. The method of claim 11, wherein the received first network topology information includes a bit index assignment for a second interface of the first node, the method further comprising:

determining that a conflicting bit index assignment exists in the operational topology; and not entering the received bit index assignment in the operational topology.

13. The method of claim 12, further comprising:

determining that the conflicting bit index assignment no longer exists in the operational topology; and in response to determining that the conflicting bit index assignment no longer exists in the operation topology, updating the operational topology to include the received bit index assignment from the network configuration topology.

14. The method of claim 11, wherein the received first network topology information indicates failure of a second interface of the first node, further comprising:

not updating the configuration topology to indicate the failure of the second interface of the first node; and removing the second interface of the first node from the operational topology.

15. The method of claim 11, wherein an entry in the operational topology corresponding to the first interface has a first bit type parameter, the received first network topology information includes configuration information for a second interface of the second node, the second interface of the second node corresponding to the first interface of the first node, the second interface having a second bit type parameter, the method further comprising:

determining that the first bit type parameter is not consistent with the second bit type parameter; and not entering the received configuration information for the second interface of the second node in the operational topology in response to determining that the first bit type parameter is not consistent with the second bit type parameter.

16. The method of claim 11, wherein the received first network topology information includes topology information for a plurality of interfaces of a respective plurality of nodes, the method further comprising:

determining that the plurality of interfaces include a first set of interfaces having consistent parameters and a second set of interfaces having inconsistent parameters;

updating the operational topology with the topology information for the first set of interfaces in response to determining that the plurality of interfaces include a first set of interfaces having consistent parameters; and not updating the operational topology with the topology information for the second set of interfaces in response to determining that the second set of interfaces have inconsistent parameters.

17. The method of claim 11, wherein the first network topology information includes a second bit index having parameters indicating a third node and an ingress group of which the first node is a member, the method further comprising:

determining a forward-routed path from the first node to the third node; and updating the configuration topology to include a second interface having parameters indicating the second bit index and the forward-routed path; and updating the second interface to include the second interface having parameters indicating the second bit index and the forward-routed path.

18. The method of claim 11, wherein the receiving of the first network topology information includes receiving Interior Gateway Protocol (IGP) data as the first network topology information.

19. The method of claim 11, further comprising receiving a Bit Index Explicit Replication Traffic Engineering (BIER-TE) packet including the routing bitstring, bits in the routing bitstring corresponding to links in the OBIFT and the CBIFT.

20. A memory device coupled to a processor of a first node of a network including a plurality of Bit Index Explicit Replication Traffic Engineering (BIER-TE) enabled nodes, the first node having a first interface to a second node and network topology information including a configuration bit index forwarding table CBIFT) containing a configuration topology of the network, and an operational bit index forwarding table OBIFT) containing an operational topology of the network, the memory device including instructions which condition the processor to perform operations comprising:

receiving first network topology information;

updating the configuration topology with the first network topology information;

verifying the updated configuration topology for consistency with the operational topology;

updating the operational topology with the first network topology information responsive to the verification finding consistency;

receiving a BIER-TE packet including a routing bitstring having a set bit at a first bit index corresponding to the first interface; and routing the BIER-TE packet to the second node based on the routing bitstring and the operational topology.

* * * * *

UNITED STATES PATENT AND TRADEMARK OFFICE
CERTIFICATE OF CORRECTION

PATENT NO. : 11,627,066 B2
APPLICATION NO. : 17/008373
DATED : April 11, 2023
INVENTOR(S) : Toerless Eckert It is certified that error appears in the above-identified patent and that said Letters Patent is hereby corrected as shown below:

In the Claims

In Column 21, Line 20, in Claim 1, delete "CBIFT)" and insert --(CBIFT)-- therefor In Column 21, Line 22, in Claim 1, delete "OBIFT)" and insert --(OBIFT)-- therefor In Column 22, Line 37, in Claim 8, delete "claims 1," and insert --claim 1,-- therefor In Column 22, Line 64, in Claim 11, delete "CBIFT)" and insert --(CBIFT)-- therefor In Column 22, Line 66, in Claim 11, delete "OBIFT)" and insert --(OBIFT)-- therefor In Column 24, Line 38, in Claim 20, delete "CBIFT)" and insert --(CBIFT)-- therefor In Column 24, Line 40, in Claim 20, delete "OBIFT)" and insert --(OBIFT)-- therefor Signed and Sealed this
Twentieth Day of June, 2023

Katherine Kelly Vidal
*Director of the United States Patent and Trademark Office*